US008245012B2

(12) United States Patent
Krauss

(10) Patent No.: US 8,245,012 B2
(45) Date of Patent: Aug. 14, 2012

(54) ADAPTIVELY PREVENTING OUT OF MEMORY CONDITIONS

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 12/253,202

(22) Filed: Oct. 16, 2008

(65) Prior Publication Data
US 2010/0100700 A1  Apr. 22, 2010

(51) Int. Cl.
*G06F 12/00* (2006.01)
(52) U.S. Cl. ......... 711/206; 711/165; 711/170; 711/173
(58) Field of Classification Search .................. 711/206, 711/165, 170, 173
See application file for complete search history.

(56) References Cited

U.S. PATENT DOCUMENTS

| | | | |
|---|---|---|---|
| 6,477,612 B1 * | 11/2002 | Wang | 711/2 |
| 7,409,522 B1 * | 8/2008 | Fair et al. | 711/170 |
| 7,487,308 B1 * | 2/2009 | Dalal et al. | 711/162 |
| 2005/0044310 A1 * | 2/2005 | Cameron | 711/112 |
| 2008/0005523 A1 * | 1/2008 | Hassan | 711/170 |
| 2008/0028143 A1 * | 1/2008 | Murase | 711/114 |

OTHER PUBLICATIONS

Krauss, "Memory-Aware Components", Dr. Dobb's Journal, <http://www.ddj.com/embedded/201804198>, Sep. 5, 2007 (last visited Oct. 16, 2008).
OSDIR.com, Mail Archive, Memory Management in Eclipse, Message 00040, <http://osdir.com/ml/ide.eclipse.equinox.devel/2006-01/msg00040.html> Jan. 24, 2006 (last visited Oct. 15, 2008).
General Programming Concepts: Writing and Debugging Programs, <publib.boulder.ibm.com/infocenter/pseries/v5r3/topic/com.ibm.aix.genprogc/doc/genprogc/genprogc.htm> (Last visited Sep. 22, 2008).
Shaw, The BlackBerry Beat, BlackBerry Patent app proposes Low memory manager for 'graceful shutdown', <http://blogs.zdnet.com/blackberry/?p=504>, Jan. 3, 2008 (Last visited Oct. 15, 2008).

* cited by examiner

*Primary Examiner* — Jae Yu
(74) *Attorney, Agent, or Firm* — Cuenot, Forsythe & Kim, LLC

(57) ABSTRACT

A computer-implemented method of preventing an out-of-memory condition can include evaluating usage of virtual memory of a process executing within a computer, detecting a low memory condition in the virtual memory for the process, and selecting at least one functional program component of the process according to a component selection technique. The method also can include sending a notification to each selected functional program component and, responsive to receiving the notification, each selected functional program component releasing at least a portion of a range of virtual memory reserved on behalf of the selected functional program component.

12 Claims, 2 Drawing Sheets

ADAPTIVELY PREVENTING OUT OF MEMORY CONDITIONS

BACKGROUND

The embodiments of the present invention relate to adaptively preventing out-of-memory conditions within a program executing on a computer. Modern computers can execute several programs concurrently. In general, each program can execute within its own "process." To facilitate execution of multiple programs, many computers utilize virtual memory. Virtual memory refers to a technique in which an executing program is "tricked" into thinking, or behaving as if, the program has access to contiguous addresses of working memory, e.g., random access memory (RAM). The actual memory used by the program, however, may be fragmented and exist within RAM, within disk storage, or within a combination of both RAM and disk storage.

Virtual memory is apportioned on a per-process basis. As such, the virtual memory allotted to a particular process is independent of the virtual memory allotted to any other process currently executing within the computer. As an example, some 32-bit operating systems typically provide two gigabytes of virtual memory to each process. Each individual operating system, however, may differ with respect to the specific implementation and management of virtual memory.

For a running program to continue to function properly, the process in which the program executes must have virtual memory available for use. As the process reserves virtual memory, less is available. When the process within which the program executes runs out of virtual memory, the program executing within that process will likely become unstable or fail altogether.

BRIEF SUMMARY OF THE INVENTION

The embodiments disclosed within this specification relate to adaptively preventing out-of-memory conditions within a program executing on a computer. One embodiment of the present invention can include a computer-implemented method of preventing an out-of-memory condition. The method can include evaluating usage of virtual memory of a process executing within a computer, detecting a low memory condition with respect to the virtual memory for the process, and selecting at least one functional program component of the process according to a component selection technique. The method can include sending a notification to each selected functional program component and, responsive to receiving the notification, each selected functional program component can release a range of virtual memory previously reserved on behalf of the selected functional program component.

Another embodiment of the present invention can include a computer-implemented method of preventing an out-of-memory condition including building a memory map representing virtual memory of a process executing within a computer. The memory map can indicate usage of the virtual memory of the process. While the process continues to execute, the memory map can be updated to reflect virtual memory state. A low memory condition for the virtual memory can be detected according to the memory map. The method further can include selecting at least one functional program component of the process according to an amount of virtual memory reserved on behalf of each functional program component and sending a notification to each selected functional program component. Responsive to receiving the notification, each selected functional program component can execute a memory recovery strategy that releases a range of virtual memory reserved on behalf of the selected functional program component.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
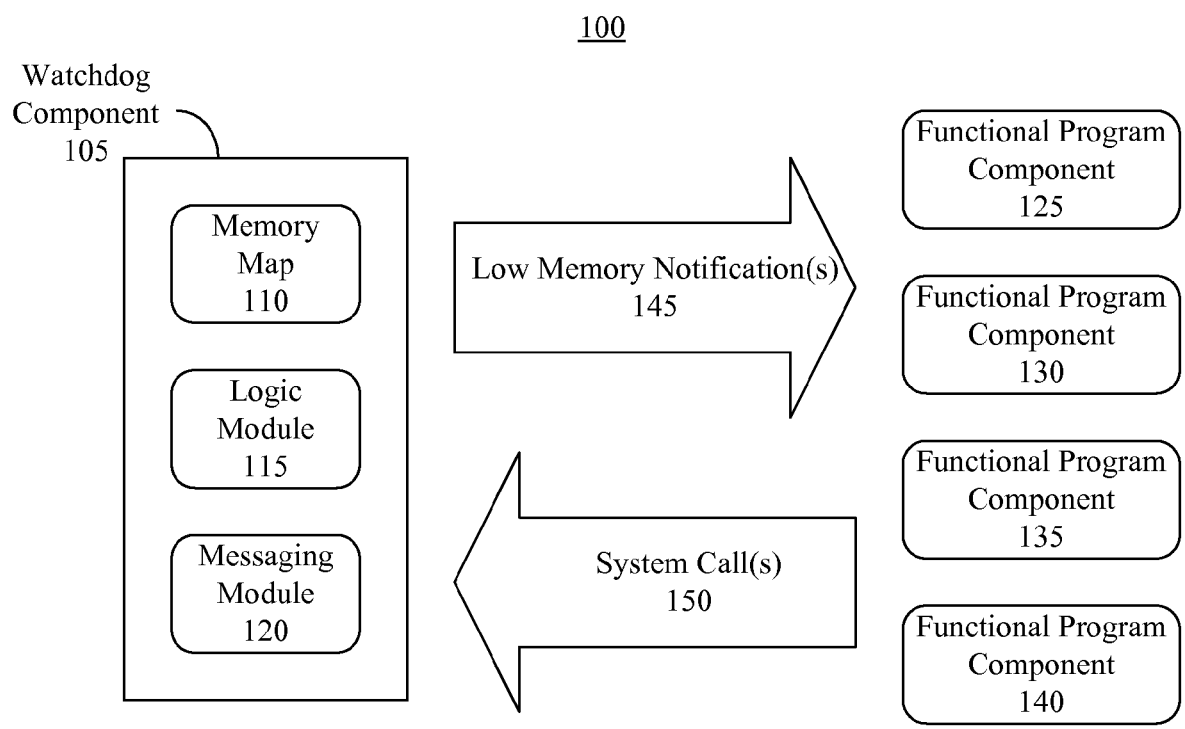
FIG. 1 is a block diagram illustrating a system for preventing out-of-memory conditions in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, microcode, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, electromagnetic, magneto-optical, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc or digital video disc read-only memory (CD-ROM or DVD-ROM), an optical storage device, a transmission medium such as those supporting the Internet or an intranet, or a magnetic storage device.

The computer-usable or computer-readable medium may be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency signal (RF), etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed within this specification relate to preventing out-of-memory conditions. Usage of virtual memory by a selected process can be monitored. When the virtual memory usage corresponds to one or more predetermined criteria, a "low memory" condition can be detected. One or more functional program components executing within the monitored process can be notified of the low memory condition. The particular functional program components that receive the low memory notifications can be selected using any of a variety of different selection techniques and/or criteria. Responsive to receiving a low memory notification, each recipient functional program component can initiate a memory recovery technique intended to free virtual memory. This increases the virtual memory available to components of the process and may avoid an out-of-memory condition.

Accordingly, out-of-memory conditions can be avoided by proactively asking functional program components of the executing process to relinquish virtual memory that may be, for example, either unused or unneeded. Some functional program components proactively reserve or commit virtual memory that may go unused. Unused virtual memory that is reserved or committed by a functional program component is unavailable to other functional program components of the program. Such virtual memory is also unavailable for alternate uses by the functional program component that has reserved or committed the virtual memory. By notifying selected functional program components of a low memory condition, potential instabilities and failures can be avoided by having functional program components that hold virtual memory release ranges of virtual memory, particularly ranges of virtual memory that are unused. Examples of the types of instabilities that may arise, and thus be avoided, when a process encounters an out-of-memory condition can include failure to allocate heap memory, failure to start new threads, failure to grow stacks, or the like. A functional program component that does not sufficiently handle such failures is likely to stop functioning.

The embodiments disclosed within this specification can be implemented in the form of computer-usable program code, e.g., program code or a program, executing within a computer. A computer, e.g., a "computer system" or "information processing system," suitable for storing and/or executing program code can include at least one processor coupled directly or indirectly to memory elements through a system bus. The memory elements can include local memory employed during actual execution of the program code. The memory elements also can include bulk storage and cache memories. For example, cache memories can provide temporary storage of at least some program code in order to reduce the number of times code must be retrieved from bulk storage during execution.

Input/output (I/O) devices such as, for example, keyboards, displays, pointing devices, microphones, speakers, disk storage devices, tape storage devices, other memory devices, etc., can be coupled to the computer either directly or through intervening I/O controllers. Network adapter(s) may also be coupled to the computer to enable the computer to become coupled to other computers, remote printers, storage devices, etc., through intervening private or public networks. Modems, cable modems, and Ethernet cards are just a few of the currently available types of network adapters.

Virtual memory generally refers to a technique in which a program is "tricked" into thinking or behaving as if that program has access to contiguous addresses of physical memory. The actual memory used by the program may be fragmented random access memory (RAM), e.g., physical memory with non-contiguous addresses, fragmented across RAM and disk storage, or possibly implemented entirely within disk storage. The state of fragmentation of the physical memory used by a program executing with a given process will change as that program continues to execute.

Many virtual memory implementation techniques divide the virtual address space of a process into pages. A page refers to a portion, e.g., a block of 4 kilobytes, of contiguous virtual memory addresses. The size of the page may differ among operating systems. Further, with respect to operating systems that utilize a "segmented memory model," where the virtual address space is divided into segments, the size of each segment may differ according to the amount of physical memory available within the computer or according to other factors. To utilize the virtual memory, each virtual memory address must be translated into a physical address, or a "real address," that is used by the computer hardware to process instructions.

One way of performing this translation is through the use of page tables that can be used to translate between a virtual memory address and a corresponding physical memory address. The process, and also the program executing therein, is only aware of the virtual memory addresses. In some operating systems, each process may have its own page table. In other operating systems, one page table may be used for all processes. "Paging" or "page swapping" refers to saving inactive virtual memory pages to disk storage and restoring the saved virtual memory pages to physical memory when required. This allows the virtual memory occupied by a process to exceed the total physical memory, e.g., RAM, of the computer. Typically, a memory management unit, e.g., a hardware component, translates between virtual memory addresses and physical addresses.

FIG. 1 is a block diagram illustrating a technique for preventing out-of-memory conditions from occurring in accordance with one embodiment of the present invention. FIG. 1 depicts a process 100 executing within a computer. In some cases, a "process" refers to an instance of a program that is being executed within a computer. Such a computer, equipped with a suitable operating system, for example, may execute several processes concurrently. Each process executing within the computer may include one or more functional program components, e.g., modules, that form the program code available to execute within that process. Each functional program component, for example, may be considered part of the program. In other cases, what appears superficially to a user as a single program may involve a plurality of processes executing within the computer or within one or more remote computers.

Accordingly, as shown, process 100 can include a plurality of executing components such as a watchdog component 105 and functional program components 125, 130, 135, and 140. It should be appreciated that the particular number of functional program components is not intended to limit the embodiments described within this specification. As such, process 100 may include fewer or more functional program components than illustrated. Each of watchdog component 105 and functional program components 125-140 can be part of a same executing program.

Watchdog component 105 can monitor usage of virtual memory within process 100 by functional program components 125-140. One way of monitoring usage of virtual memory is by intercepting system calls 150 invoked by the various functional program components 125-140 available to execute within process 100, as the functional program components 125-140 make these calls in order to reserve or commit virtual memory. Responsive to detecting a low memory condition, watchdog component 105 can notify one or more, all, or a selected subset of functional program components 125-140 regarding the low memory condition through one or more low memory notifications 145. Responsive to receiving a low memory notification 145, each of functional program components 125-140 that is a recipient of the low memory notification 145 can implement a virtual memory recovery technique that attempts to, or does, release virtual memory associated with that respective component.

As shown, watchdog component 105 can include a memory map 110, a logic module 115, and a messaging module 120. Memory map 110 can be a representation of the state of the virtual memory of process 100 at any given time. As such, the state of memory map 110 will continue to change and be updated dynamically by watchdog component 105 as the state of the virtual memory of process 100 changes.

By way of example, the sort of information that may be included within memory map 110 can include the portion of virtual memory, e.g., addresses or address range(s), reserved and/or committed by functional program components 125-140, the state of each range of virtual memory reserved and/or committed on behalf of a functional program component, and the name or an indication of the functional program component on behalf of which the range of virtual memory has been reserved and/or committed. For example, portions of the virtual memory used for stacks, heaps, module code, or data sections can be tracked within memory map 110. As used herein, the term "range" can refer to two or more contiguous addresses. Accordingly, "a range of virtual memory," "a range of virtual memory addresses," "a virtual memory range," and "a virtual memory address range" will be synonymous as each refers to one or more contiguous addresses of virtual memory.

Within modern operating systems, possible states of the virtual memory can include "free," "reserved," and "committed." Free virtual memory refers to virtual memory, e.g., a page, which is not reserved or committed to any component of the process. Free virtual memory, e.g., also referred to as unreserved virtual memory, though available for reservation or commitment by a functional program component, is not actually usable by process 100 until reserved and/or committed. As used within this specification, the term "reserved" can refer to a range of virtual memory that has been reserved or committed by a particular component. In typical operating systems, virtual memory that is committed for some particular use by a process is also reserved.

Reserved virtual memory can refer to a range of virtual memory, e.g., a region, that cannot be used by other allocation functions of an operating system. Thus, reserved virtual memory is not available for use by other functional program components within process 100. A reserved range of virtual memory typically cannot be reused for purposes other than those for which the range of virtual memory was reserved, either by the functional program component that reserved the range of virtual memory or by another functional program component, without first being released by the functional program component that reserved the range of virtual memory. When a range of virtual memory is reserved by a functional program component, that functional program component may not use the reserved range of virtual memory without first committing that range of virtual memory with one or more ranges of physical memory. Thus, committed virtual memory refers to virtual memory that has been reserved by a functional program component and also associated with physical storage such as RAM. In general, the term "usage," as applied to virtual memory, can refer to the state of selected virtual memory addresses whether free, reserved, or committed. The terms "used" or "unused," however, can refer to whether a component has written to, read from, or both written to and read from a range of committed virtual memory.

Memory map 110 can specify which ranges of virtual memory have been reserved, which ranges of reserved virtual memory have been committed, the particular component on behalf of which each range of virtual memory has been reserved and/or committed, a time stamp when the reservation of a range of virtual memory occurs, a time stamp when the commitment of a range of virtual memory occurs, and the like. Memory map 110 may also explicitly, or implicitly, e.g., by virtue of the absence of particular virtual memory address ranges, specify range of unreserved virtual memory. For example, when a range of virtual memory is released, all reference to that range of virtual memory can be deleted from memory map 110. Alternatively, memory map 110 can continue tracking the unreserved range while representing that range as unreserved. In such an embodiment, if the range is contiguous with another range that was unreserved, memory map 110 can track the entire contiguous unreserved space, e.g., both ranges, as a single unreserved range.

In one embodiment, memory map 110 can be created or updated by probing through the virtual memory address space of process 100 using any of a variety of known functions suited to identifying the status of different virtual memory address ranges. For example, within a Windows® type of operating system, the VirtualQuery function can be used to probe one or more virtual memory addresses specified as an argument to the function. The results specify the state of the virtual memory address(es) provided as the function argument. Memory map 110 can be initially created by repeatedly invoking VirtualQuery to probe address ranges of the virtual memory of process 100.

In another embodiment, memory map 110 can be created by intercepting system calls 150 that cause the allocation or release, e.g., freeing, of ranges of virtual memory. Whether created using a function such as VirtualQuery or not, memory map 110 can be maintained by continued interception of system calls 150 from functional program components 125-140 that cause ranges of virtual memory of process 100 to be reserved, committed, or released.

For each system call 150 that is intercepted, the call chain leading to that system call can be examined to determine the responsible functional program component, e.g., the functional program component that is requesting that the system reserve, commit, or release a range of virtual memory. That information, whether the call chain, relevant portions of the call chain, immediate caller address, or some other means of identifying the functional program component that has requested reservation, commitment, or release of virtual memory, can be annotated in memory map 110 with the range of virtual memory so allocated.

Examples of system calls 150 that may be intercepted within a Windows® type of operating system can include, VirtualAlloc which can reserve and/or commit a free range of virtual memory for some particular use by a functional program component. The function VirtualAlloc, for example, can commit a range of reserved virtual memory, but cannot reserve the range of virtual memory a second time without that virtual memory region first being released. A function such as VirtualFree within a Windows® type of operating system can de-commit a committed range of virtual memory or can de-commit and release a range of committed virtual memory. Other functions that can reserve and free memory include NtAllocateVirtualMemory and NtFreeVirtualMemory respectively. It should be appreciated that these system calls are provided for purposes of illustration only. Additional system calls such as HeapCreate, also can be intercepted. Further, the particular system calls that are to be intercepted can vary from one type of operating system to another.

These sorts of system calls, as well as any other system calls responsible for usage of the virtual memory of process 100, e.g., functions that request thread creation, heap allocation, and the like, can be intercepted by watchdog component 105. The logic module 115 can include, for example, a function that updates memory map 110 according to the particular memory call 150 that is intercepted.

In one embodiment, a system call 150 to be intercepted can be modified by changing the instructions at the address of that system call, e.g., by replicating the instruction(s) at that address and replacing the instruction(s) with a jump instruction that passes control to a bookkeeping function within logic module 115. The bookkeeping function can update memory map 110 according to the particular parameters of system call 150 that has been intercepted. The bookkeeping function can, for example, record, within memory map 110, any reservation, commitment, and/or release of virtual memory, include a time stamp, include the status of the subject range of virtual memory, and record the component to which the range of virtual memory is reserved or committed, or from which the range of virtual memory has been released. Control can be passed back to the replicated instruction(s) and onward to the remaining system call instructions.

In another embodiment, watchdog component 105 can export a set of application programming interface (API) functions that the functional program components 125-140 may call in lieu of regular system calls. Rather than each functional programming component 125-140 making system calls, each functional program component 125-140 can call a function of watchdog component 105 via the API. In response, watchdog component 105 can invoke the appropriate system calls and track usage of virtual memory as described. The API of watchdog component 105 can include functions for performing tasks including, but not limited to: loading and/or unloading modules containing executable code; loading and/or unloading files of any kind; creating and/or destroying threads and fibers; creating and/or destroying memory heaps; allocating, de-allocating, and re-allocating heap memory blocks; mapping and/or un-mapping memory ranges shared with other processes or used for memory-mapped I/O; and directly committing, reserving, and/or releasing ranges of contiguous virtual memory; or the like.

It should be appreciated that the watchdog component implementations disclosed within this specification are provided for purpose of illustration only. As such, the particular implementation of the watchdog component is not intended to limit the embodiments disclosed within this specification.

In this or any other watchdog component implementation, an application-wide handler for stack guard page exceptions may also be incorporated. Such a handler can keep track of growing thread or fiber stacks. In any event, the earlier that watchdog component 105 is loaded in the lifetime of process 100, the more reservations and commitments of virtual memory are likely to be detected.

The logic module 115 further can monitor the state of memory map 110 for one or more low memory conditions. The low memory conditions may be predetermined conditions or may be user-defined conditions. In one embodiment, for example, logic module 115 can determine when the unreserved virtual memory for process 100 falls below a threshold. In another embodiment, logic module 115 can determine when a smallest range of unreserved virtual memory does not exceed a threshold amount of virtual memory. Responsive to detecting a low memory condition, logic module 115 can select which of functional program components 125-140 are to receive low memory notifications 145. Accordingly, logic module 115 can communicate which of the functional program components 125-140 are to receive the low memory notification 145 to messaging module 120. Messaging module 120 can send low memory notification 145 to each selected one of functional program components 125-140.

By notifying one or more selected functional program components within process 100 of the low memory condition, potential failures and instabilities can be avoided. Responsive to receiving low memory notification 145, each recipient functional program component can implement a virtual memory recovery strategy. For example, a recipient functional program component can implement a garbage collection function, free reserved and uncommitted memory, free unused and committed memory, or free a portion of a range of virtual memory that may be unnecessarily reserved or committed. In another example, any components of process 100 that are not currently in use can be unloaded. For example, in cases where a first functional program component depends upon a second functional program component only at particular times, the second functional program component can be unloaded when not needed. Forced unloading of the second functional program component may also be performed despite whether the first functional program component is in need of the functionality of the second functional program component. Such forced unloading, however, may result in temporary loss of program functionality.

In practical terms, depending upon the particular application, a virtual memory recovery technique may result in a network server refusing new connections, a graphical user interface (GUI) process with multiple documents being open prompting a user to close one or more of the open documents, an embedded control system for a car or aircraft selecting some stored state data to be deleted, a security camera system transferring recorded images from a frame buffer to persistent storage and then purging the frame buffer, or the like.

Figure 2:
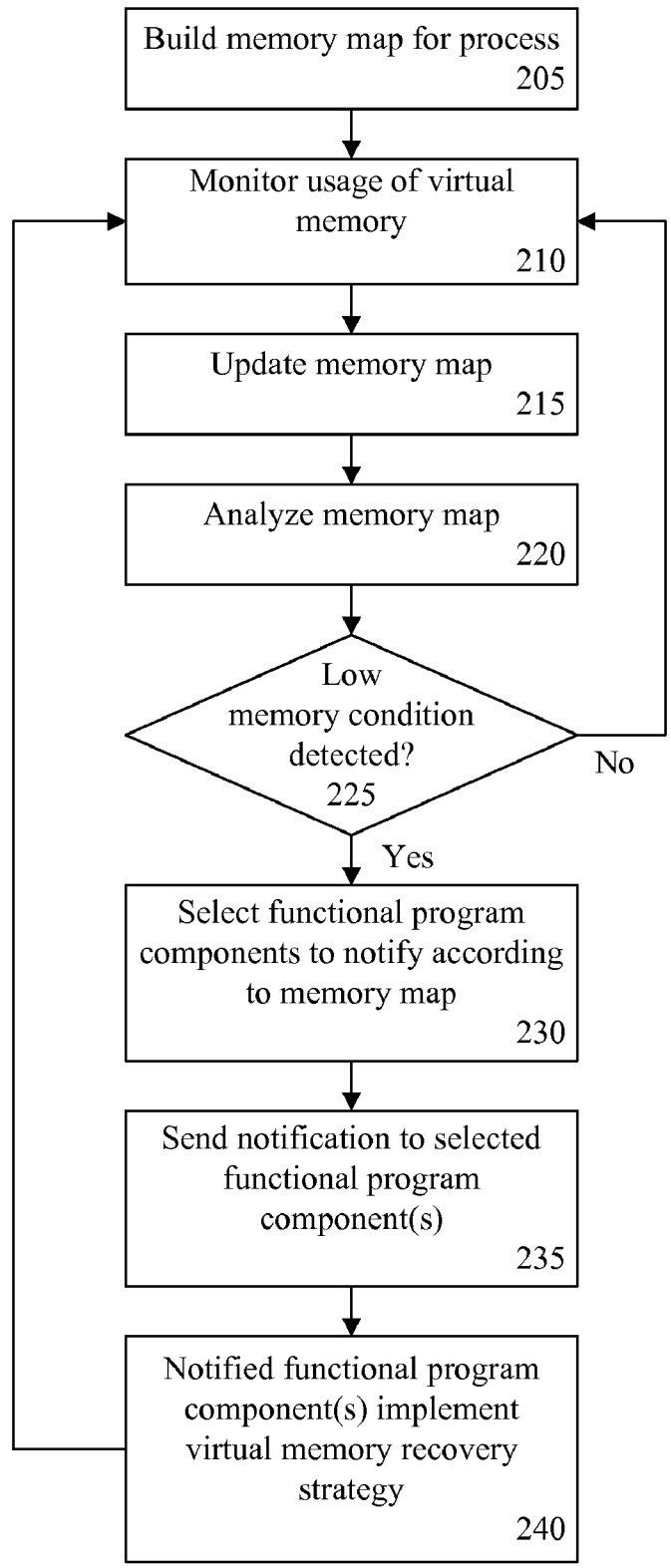
FIG. 2 is a flow chart illustrating a method of preventing out-of-memory conditions in accordance with another embodiment of the present invention.

FIG. 2 is a flow chart illustrating a method 200 of preventing out-of-memory conditions from occurring in accordance with another embodiment of the present invention. Method 200 can be performed, for example, by a watchdog component of the type described with reference to FIG. 1. Accordingly, method 200 can begin in a state where a watchdog component, as described within this specification, can load alongside of one or more other functional program components of a program within a process being executed on a computer.

In step 205, the watchdog component can begin building a memory map for the process within which the program code of the watchdog component is executing. The memory map, as noted, is a representation of the state of the virtual memory. The memory map may be built through continual interception of system calls initiated by components of the process. The memory map may also be initially created through repeated invocations of a function that, given a virtual memory address or range of addresses, returns the status of the enumerated virtual memory addresses. Through repeated calls to such a function, the virtual memory of the process can be traversed to build and/or maintain the memory map.

In step 210, the watchdog component can monitor virtual memory usage. The watchdog component can detect instances where virtual memory is reserved, committed, or released. As noted, the watchdog component can determine the particular component on behalf of which a range of virtual memory is reserved or committed, the time at which the reservation or commitment of the range of virtual memory occurred, and the like. As the state of ranges of virtual memory changes, e.g., from reserved to committed or from committed to reserved, such information can be detected and time stamped as well. The release of ranges of virtual memory also can be annotated and time stamped within the memory map. In step 215, the watchdog component can update the memory map with information determined in step 210.

In step 220, the watchdog component can analyze the memory map to identify one or more low memory conditions. As noted, low memory conditions may include predetermined low memory conditions and/or user-defined low memory conditions. In general, a low memory condition can be one that indicates when an amount of virtual memory that is unreserved has fallen below a threshold amount established for the process. The particular type of low memory condition, however, may vary according to user preference.

Examples of low memory conditions can include when the amount, e.g., a total amount, of unreserved virtual memory of the process falls below an established threshold amount, when the largest range of unreserved virtual memory falls below an established threshold size, or when the number of ranges of unreserved virtual memory, where each range of unreserved virtual memory is larger than an established threshold size, falls below an established quantity. As noted, a range refers to one or more contiguous addresses of virtual memory. In other cases, the thresholds to which free virtual memory is compared can be dynamic in nature. For example, the average size of ranges of virtual memory reserved through intercepted system calls within the process or the average size of portions of virtual memory reserved for functional program components within the process can be calculated. The average size can be used as a threshold with respect to unreserved virtual memory or to ranges of unreserved virtual memory, with the presumption that any further need of virtual memory will be approximately equal to the average amount (size) of virtual memory reserved on behalf each respective component or to the average amount of virtual memory requested by components within the process.

In step 225, a determination can be made as to whether a low memory condition has been detected. If so, the method can proceed to step 230. If not, the method can loop back to step 210 to continue monitoring usage of the virtual memory of the process. The loop need not keep a thread busy at all times. It should be appreciated that each invocation of the method can occur at the time of system call interception, can occur based upon other events that occur repeatedly or regularly, or can occur in a loop continuously executed by a low-priority thread specific to the watchdog component.

Continuing with step 230, one or more functional program components can be selected for receiving a low memory notification. The watchdog component can select one or more or all loaded functional program components, in the executing process, that meet established criteria, e.g., a component selection technique or strategy. Those components can be selected as recipients of the low memory notification.

Functional program components can be selected according to a variety of different criteria. For example, functional program components can be selected according to the amount of virtual memory that has been reserved or committed on behalf of each functional program component, according to how long, e.g., a length of time, virtual memory has been reserved by each functional program component according to the time stamp information in the memory map, or any combination thereof. The criteria can be used to prioritize or order the functional program components such that the highest ranking functional program component receives the low memory notification, the highest "N" functional program components, where "N" is an integer greater than zero, receive the low memory notification, or so that any functional program component that meets the criteria receives a low memory notification. In another aspect, a number of functional program components can be selected that results in an expected release of a predetermined amount of reserved virtual memory can be selected.

For example, functional program components can be ordered according to the amount of reserved and uncommitted virtual memory reserved for each functional program component, the amount of committed and unused virtual memory reserved for each functional program component, the amount of time the virtual memory, whether reserved and uncommitted and/or unused and committed, has been reserved for each functional program component, or any combination thereof, e.g., using a prioritization function that depends upon one or more or all such criteria. The top "N" functional program components can be selected to receive the low memory notifications. In another embodiment, any functional program component having reserved at least a minimum amount of virtual memory, whether reserved and uncommitted and/or unused and committed, can be notified. In another embodiment, any functional program component having reserved an amount, e.g., one or more ranges, of virtual memory for a period of time longer than some established threshold or longer than each other functional program component can be selected to receive the low memory notification.

It should be appreciated that each reservation or commitment of a range of virtual memory on behalf of a functional program component can be tracked individually. For example, it may be possible for a functional program component to have committed one virtual memory range that is unused and another virtual memory range that is being used. One virtual memory range may have been committed on behalf of a functional program component for a longer period of time than another virtual memory range that has also been committed on behalf of the same functional program component. Still, each virtual memory range can be tracked and used in selecting functional program components to receive the low memory notification. That is, each virtual memory range of a functional program component may be analyzed independently of each other virtual memory range and, therefore, cause the functional program component to meet one or more criteria.

The determination as to whether virtual memory, once committed, is being used can be performed in a variety of different ways. In one example, a compression algorithm can be applied to the contents of a portion of virtual memory. For instance, the Lempel-Ziv-Welch (LZW) compression algorithm can be used. A compression algorithm can be used to evaluate the contents of a given range of virtual memory and determine whether that range of virtual memory is in use, e.g., includes data. In general, virtual memory that is reserved and/or committed is likely to be initialized to some repeating value, e.g., zeros. A compression algorithm will likely compress such ranges, e.g., ranges that are reserved but unused, to a greater degree than ranges that are used and that therefore include data.

Typically, a committed virtual memory range will be initialized to some known state or pattern, e.g., zeros. If needed, this initialization can be enforced via a system call interception. Given this initialization, the contents of the virtual memory range will, when processed using a compression algorithm, appear to have little or no complexity. As the virtual memory range is used, e.g., as data is written to the virtual memory range, by a functional program component, the complexity of the content of that virtual memory range will increase. Accordingly, depending upon on the complexity algorithm being used, various thresholds can be set.

A committed virtual memory range can be said, or presumed, to be unused when the measure of complexity does not exceed the threshold. When the measure of complexity does exceed the threshold, the virtual memory range can be said to be unused. In this example, the higher the complexity, the higher the likelihood that data has been written to the committed virtual memory range. For example, given a compression algorithm that represents 4,096 NULL bytes using 12 bytes and represents 4,096 bytes set to any other value or values using more than 12 bytes, a 4,096-byte range can be presumed to be in use if its content cannot be represented in as little as 12 bytes by the compression algorithm.

Another way of determining whether committed virtual memory has been used is by tracking read accesses, write accesses, or both to that range of virtual memory. When such accesses are recorded or detected, it can be determined, or presumed, that the range of virtual memory is being used.

In step 235, the watchdog component can send a low memory notification to each selected functional program component. In another embodiment, the low memory notifications can be implemented by a generating a non-fatal exception or by writing to a data location that is polled by functional program components within the process. Each functional program component can be programmed to respond to only particular types of exceptions for low memory or to respond to only particular codes written to the data location.

In step 240, each functional program component that receives a low memory notification can responsively implement a virtual memory recovery technique to release virtual memory that has been reserved by that functional program component. As noted, a recipient component can implement a garbage collection function, release reserved and uncommitted memory, release unused and committed memory, or release a portion of a range or a range of any such virtual memory that may be safely released by that functional program component. Additionally, a functional program component that is not a critical functional program component or that is not currently in use can be unloaded from the process.

In releasing virtual memory, each selected functional program component can utilize criteria similar to that used to select the functional program components. For example, a selected functional program component may choose to release reserved and uncommitted virtual memory or unused and committed virtual memory. All such virtual memory may be released at once or in predetermined amounts. In another aspect, those range considered to be oldest of the reserved and uncommitted ranges or the oldest of the unused and committed ranges can be released.

After step 240, the watchdog component can loop back to step 210 to continue monitoring the usage of virtual memory of the process.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of preventing an out-of-memory condition comprising:
    evaluating usage of virtual memory of a process executing within a computer;
    detecting a low memory condition in the virtual memory for the process;
    selecting at least one functional program component of the process according to a component selection technique;
    sending a notification to each selected functional program component; and
    responsive to receiving the notification, each selected functional program component releasing a range of virtual memory reserved on behalf of the selected functional program component, wherein
    selecting at least one functional program component of the process according to a component selection technique comprises selecting a functional program component according to an amount of virtual memory that is reserved and uncommitted on behalf of each functional program component.

2. The computer-implemented method of claim 1, wherein evaluating usage of virtual memory within a process executing within a computer comprises:
    building a memory map of the virtual memory of the process; and
    while the process continues to execute, updating the memory map to specify usage of virtual memory of the process.

3. The computer-implemented method of claim 1, wherein detecting a low memory condition in the virtual memory for the process comprises determining that an amount of unreserved virtual memory of the process is less than a minimum amount of virtual memory.

4. The computer-implemented method of claim 1, wherein detecting a low memory condition in the virtual memory for the process comprises determining that a largest range of unreserved virtual memory for the process is less than a minimum size.

5. The computer-implemented method of claim 1, wherein selecting at least one functional program component of the process according to a component selection technique comprises selecting a functional program component on behalf of which more virtual memory has been reserved and remains uncommitted than each other functional program component.

6. The computer-implemented method of claim 1, wherein selecting at least one functional program component of the process according to a component selection technique comprises selecting a functional program component according to an amount of time virtual memory has been reserved and remains uncommitted on behalf of each functional program component.

7. The computer-implemented method of claim 1, wherein selecting at least one functional program component of the process according to a component selection technique comprises selecting a functional program component on behalf of which virtual memory has been reserved and uncommitted longer than each other component.

8. The computer-implemented method of claim 1, wherein selecting at least one functional program component of the process according to a component selection technique comprises selecting a functional program component according an amount of unused and committed virtual memory reserved on behalf of each functional program component.

9. The computer-implemented method of claim 1, wherein selecting a functional program component of the process according to a component selection technique comprises selecting a functional program component on behalf of which more unused and committed virtual memory is reserved than each other component.

10. The computer-implemented method of claim 1, wherein selecting at least one functional program component of the process according to a component selection technique comprises selecting a functional program component according to an amount of time unused and committed virtual memory has been reserved on behalf of each functional program component.

11. The computer-implemented method of claim 1, wherein selecting at least one functional program component of the process according to a component selection technique comprises selecting a functional program component on behalf of which unused and committed virtual memory has been reserved longer than each other functional program component.

12. A computer-implemented method of preventing an out-of-memory condition comprising:
    evaluating usage of virtual memory of a process executing within a computer;
    detecting a low memory condition in the virtual memory for the process;
    selecting at least one functional program component of the process according to a component selection technique;
    sending a notification to each selected functional program component; and
    responsive to receiving the notification, each selected functional program component releasing a range of virtual memory reserved on behalf of the selected functional program component, wherein
    the low memory condition is detected by determining that a number of ranges of virtual memory, wherein each range of virtual memory is larger than a threshold size, is less than a minimum quantity.

* * * * *